May 15, 1962

D. P. MELONE 3,034,614

WING LATCH ASSEMBLY

Filed Nov. 13, 1959

Inventor
DRURY P. MELONE

By R. J. Tompkins

Attorney

May 15, 1962 D. P. MELONE 3,034,614
WING LATCH ASSEMBLY
Filed Nov. 13, 1959 2 Sheets-Sheet 2

Inventor
DRURY P. MELONE
By R. J. Tompkins
Attorney

United States Patent Office 3,034,614
Patented May 15, 1962

3,034,614
WING LATCH ASSEMBLY
Drury P. Melone, Garland, Tex., assignor, by mesne assignments, to the United States of America as represented by the Secretary of the Navy
Filed Nov. 13, 1959, Ser. No. 852,919
2 Claims. (Cl. 189—36)

This invention relates to latch assemblies and more particularly to the provision of means for detachably joining together two elements which are only movable relative to one another in some given path of movement.

Juncture of two elements is achieved by extending a latch bolt with a beveled outer end through a hole in one element and providing spring bias to urge the beveled surface of the bolt end against the counter-beveled surface of the second element. In this way not only are the two elements kept from separating but, in addition, there is provision for automatic "take-up" of the spring-biased bolt in the event the elements move closer to one another.

One of the applications in which this device has proven of utility has been to hold the wings of a missile to the fuselage thereof. As a result of the automatic "take-up" feature of this latch assembly the vibration of such detachable wings has been eliminated.

It is therefore a main object of the present invention to provide means for detachably joining together two elements in which motion relative to one another is limited to some fixed path of movement.

Another object of the present invention is to provide automatic "take-up" means to assure a tight, virbration-free juncture between two elements movable relative to one another in a fixed path of movement.

Still another object of the present invention is the provision of means for quickly and positively joining or dismantling two elements whose relative motion is limited to a fixed path of travel.

Other objects and many of the attendant advantages of this invention will be readily appreciated as the same becomes better understood by reference to the following detailed description when considered in connection with the accompanying drawings wherein.

Figure 1:
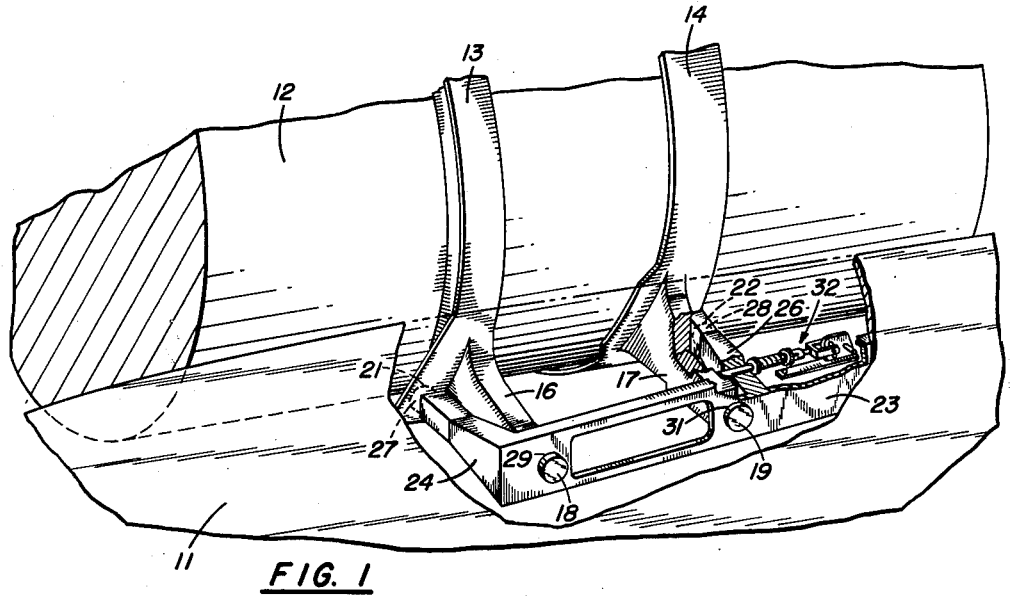
FIG. 1 is an isometric view of a preferred embodiment of the latch assembly with the latch bolt in securing position.
Figure 2:
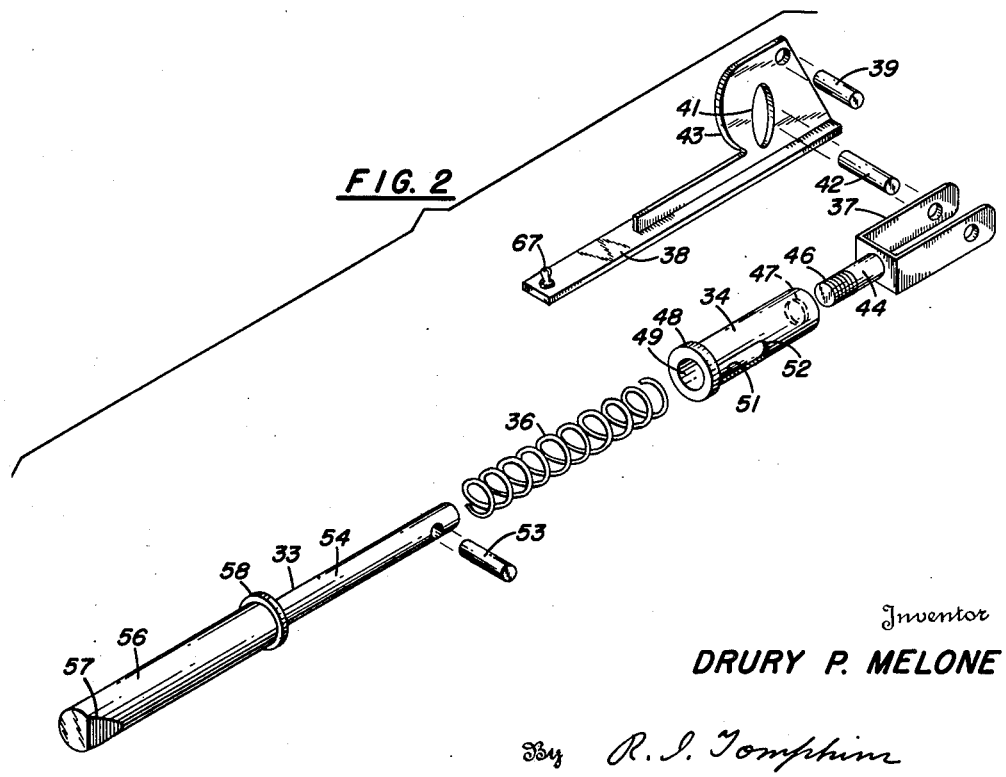
FIG. 2 is an exploded isometric showing the parts of the preferred embodiment of the latch assembly.
Figure 3:
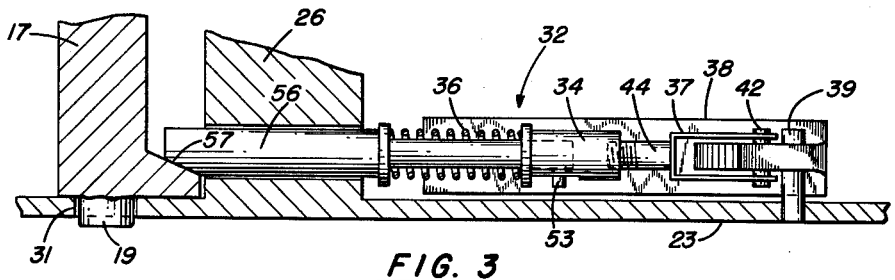
FIG. 3 is an enlarged view of sec. 3—3 taken on FIG. 1 and showing the beveled bolt end in latched position.
Figure 4:
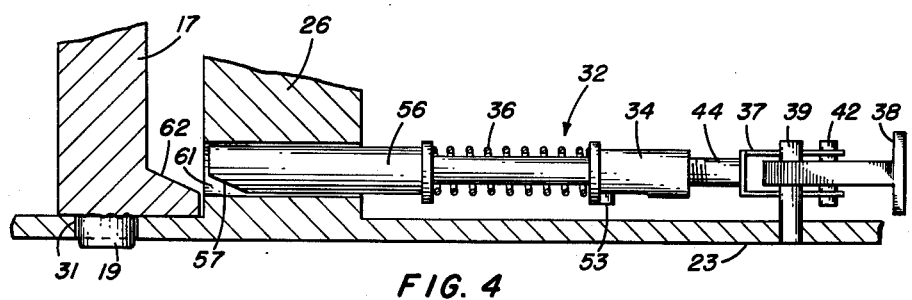
FIG. 4 is a second view taken on sec. 3—3 of FIG. 1 showing the latch assembly in unlatched position.
Figure 5:
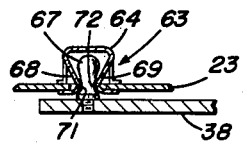
FIG. 5 is an enlarged detail of the fastening means for the latch assembly handle.

In detail, referring to the drawings, the present device is described for use in mounting a detachable wing 11 upon the fuselage 12 of a missile. Fuselage 12 is girdled by fuselage formers 13, 14 integral with which are fuselage receptacles 16, 17 having stub shafts 18, 19 formed thereon. Stub shafts 18, 19 are designed to fit holes 21, 22 in fuselage formers 13, 14. Casting 23 providing support for wing 11 has integrally-formed wing receptacles 24, 26 having stub shafts 27, 28 formed thereon. Casting 23 further has holes 29, 31 formed therein. The stub shafts and holes are so spaced and oriented relative to each other that wing 11 may be placed into engagement with fuselage 12 by aligning stub shafts and holes as, for example, by aligning stub shaft 18 with hole 29 and stub shaft 19 with hole 31. Because of the relative positions thereof stub shaft 27 will perforce be aligned with hole 21 and stub shaft 28 with hole 22. Once so aligned and mutually engaged, relative motion between wing 11 and fuselage 12 is limited to translatory motion as the stub shafts are moved into or out of the holes in the receptacles.

In order to retain wing 11 in engagement with fuselage 12 latch assembly 32 has been provided mounted on casting 23. Latch assembly 32 comprises in general latch bolt 33, sleeve 34, spring 36, yoke 37 and handle 38. Handle 38 is pivotably attached to casting 23 as by a pin connection 39 and functions as a can lever. Offset below the pivot point, pin connection 39, and to the side thereof toward yoke 37 (when latch assembly 32 is in latched position) is oval-shaped opening 41 through handle 38. Yoke 37 is attached to handle 38 by means of pin 42 connecting the arms of yoke 37 and passing through opening 41. Yoke 37 is so proportioned as to allow the unobstructed passage of round face 43 of handle 38 therethrough when the handle is pivoted to release position. Oval-shaped opening 41 is so designed to minimize wear and strain as pin 42 moves from one point to another around opening 41 to bear thereon during the movement of handle 38 in the process of opening or closing the latch. Sleeve 34 is screwed to shaft 44 of yoke 37 by means of threads 46 thereon and a threaded hole 47 in one end of sleeve 34. At the opposite end of sleeve 34 is spring retaining flange 48 with opening 49 passing therethrough leading to the hollow interior of sleeve 34. Passing through the cylinder wall 51 of sleeve 34 is slot 52 the long axis thereof being parallel to the longitudinal axis of the sleeve 34. Slot 52 is penetrated by latch pin 53 screwed or otherwise fastened into spring shaft 54 of latch bolt 33. As shown, latch bolt 33 consists of a head shaft 56 having a beveled portion 57 at its outer end. At the rear of this forward portion 56 is spring retaining shoulder 58 similar to spring retaining flange 48. To the rear of spring retaining shoulder 58 projects spring shaft 54, so-called since it passes through the center of spring 36. Spring 36 is arranged to be compressed between spring retaining shoulder 58 and spring retaining flange 48 whereby a constant bias force is exerted on latch bolt 33 while in the latched position. Spring shaft 54 extends through the center of spring 36, through opening 49 and into sleeve 34. Latch pin 53 secured to spring shaft 54 of latch bolt 33 projects outwardly therefrom passing through slot 52 thereby preventing the rotation of latch bolt 33 within sleeve 34 and at the same time limiting the translatory motion thereof into or out of sleeve 34 to the length of slot 52.

As shown, the head shaft 56 extends into bore 61 in wing receptacle 26. When latch bolt 33 is in secured position head shaft 56 is projected through bore 61 with beveled portion 57 wedged by the force of spring 36 against beveled surface 62 which functions as a keeper. As a practical application beveled surface 62 will be made parallel to beveled portion 57 to yield larger area contact between the beveled areas as well as to enable ease of take-up to eliminate vibration. It is to be noted that the compressive force acting upon spring 36 can be varied by adjusting the distance between spring retaining flange 48 and spring retaining shoulder 58. This adjustment is easily accomplished by disconnecting yoke 37 from handle 38 and rotating shaft 44 so as to lengthen or shorten the exposed length of shaft 44 and then re-connecting yoke 37 and handle 38 with pin 42 passing through opening 41.

The biasing force of spring 36 is sufficiently large so that if the fuselage receptacle 17 or wing receptacle 26 moves or vibrates the beveled portion 57 will, under the force of spring 36, take up the slack constantly pushing latch bolt 33 forward into locking position.

Fastening means 63 is provided to retain handle 38 flush with the bottom of casting 23 when assembly 32 is in latched position. Fastening means 63 comprises spring 64. Dimpled shaft 67 protruding upwardly from handle 38 is engaged by spring 64, the curved portions 68, 69 of which seat in dimples 71, 72 to hold handle 38 in place when assembly 32 is latched.

Thus, to disengage latch assembly 32, handle 38 is pulled down from fastener 63. Once disengaged handle 38 will drop down about 15° to allow the application of manual pressure thereto to push the handle back. As handle 38 is pivoted back about pin connection 39, pin 42 will move up in opening 41 as opening 41 is re-oriented to a position below and to the opposite side of pin connection 39 from its prior position in a direction away from fuselage receptacle 17. Yoke 37 attached to pin 42 and sleeve 34 screwed to shaft 44 of yoke 37 are likewise moved in a direction away from fuselage receptacle 17. As sleeve 34 moves back, it engages latch pin 53 extending through slot 52. This in turn moves back latch bolt 33 to which latch pin 53 is affixed. When latch bolt 33 has been moved back compressing spring 36 to an even greater degree, beveled porton 57 is disengaged from beveled surface 62 permitting removal of wing 11 from fuselage 12.

To latch wing 11 in place again, wing receptacles 24, 26 and fuselage receptacles 16, 17 must be engaged as described above. Handle 38 is then moved forward, pivoting about pin connection 39. Pin 42 moves down in oval-shaped opening 41 as that opening is re-oriented to a position below and between pin connection 39 and yoke 37. This movement results in engaging beveled portion 57 under the force of spring 36 with beveled surface 62 as a result of moving yoke 37 and sleeve 34 toward fuselage receptacle 17 sufficiently far to disengage sleeve 34 from latch pin 53 in slot 52. Thus latch pin 53 and spring shaft 54 of latch bolt 33 have moved aft in sleeve 34. During the occurrence of this movement sleeve 34 by means of spring retaining flange 48 compresses spring 36 constantly urging latch bolt 33 toward fuselage receptacle 17. In this way if either fuselage receptacle 17 or wing receptacle 26 move or vibrate beveled portion 57 will move up on beveled surface 62 to take up the slack and thereby effectively eliminating such vibration insuring rigid contact between wing 11 and fuselage 12. To insure that handle 38 will remain flush against casting 23, handle 38 is pushed into this position so that dimpled shaft 67 will be engaged by springs 64, 66.

Although the illustration used herein employs elements which are rendered movable relative to one another in translatory motion it is within the concept herein to apply the present invention to join elements so oriented that movement of either one relative to the other will be rotative motion.

Obviously many modifications and variations of the present invention are possible in the light of the above teachings. It is therefore to be understood that within the scope of the appended claims the invention may be practiced otherwise than as specifically described.

What is claimed is:

1. A closure fastener comprising a latch bolt, the head of said latch bolt having a beveled end, longitudinally extending sleeve having a first end thereof arranged to receive for limited translatory motion within its recess a shaft extending axially to the rear of said latch bolt, a cam lever pivotally supported upon a first structural element, a fork means being thread connected at its first end to the other end of the sleeve and pin-connected at its second end to said cam lever, said first structural element being adapted to be joined by said latch bolt to a second structural element having a beveled surface formed thereon and biasing means interposed between said tubular means and said latch bolt whereby said cam lever may be actuated to move said latch bolt into contact with said beveled surface of said second structural element to enable said biasing means to constantly urge said beveled end of said latch bolt against said beveled surface to insure a vibration-free juncture between said first and second structural elements.

2. A bolt lock comprising a latch bolt with a forward end of a first predetermined cross section and an after end of a second, relatively smaller cross section so that a shoulder is formed at the point of cross sectional change, the forward end having a beveled face and the after end having a traverse recess, a keeper with a surface beveled to match the forward end of the latch bolt, a guide for guiding the forward end of the bolt, a helical spring arranged coaxially with the after end of the latch bolt, the forward end of the spring abutting the latch bolt shoulder, a sleeve with female threads in its after end containing a side slot running axially with the bore which slot terminates prior to reaching either end of the sleeve and the forward end aligned on the after end of the latch bolt so that said slot is over the recess in the latch bolt, a pin for inserting through the slot and into the recess, a Y-shaped member with a threaded leg for engaging the after end of the threaded sleeve and parallel yoke arms each containing a hole perpendicular to the axis of the threaded leg, a pin for inserting through the holes in the yoke arms, cam means for acting upon said pin whereby said cam effects a locking action by forcing the yoke and sleeve forward thereby compressing the spring which acts against the latch bolt shoulder forcing the beveled end of the latch bolt to positively engage the matching beveled face of the keeper.

References Cited in the file of this patent

UNITED STATES PATENTS

| | | |
|---|---|---|
| 1,604,540 | Taggart | Oct. 26, 1926 |
| 1,644,240 | Devereaux | Oct. 4, 1927 |
| 2,925,966 | Kongelbeck | Feb. 23, 1960 |